(12) United States Patent
Sanyal et al.

(10) Patent No.: US 7,962,468 B2
(45) Date of Patent: Jun. 14, 2011

(54) SYSTEM AND METHOD FOR PROVIDING IMAGE LABELING GAME USING CBIR

(75) Inventors: Subhajit Sanyal, Karnataka (IN); Srinivasan H. Sengamedu, Malleswaram (IN); Sriram J. Sathish, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 399 days.

(21) Appl. No.: 12/104,954

(22) Filed: Apr. 17, 2008

(65) Prior Publication Data

US 2009/0265383 A1 Oct. 22, 2009

(51) Int. Cl.
*G06F 7/00* (2006.01)
(52) U.S. Cl. ........................................ 707/706
(58) Field of Classification Search .............. None
See application file for complete search history.

(56) References Cited

U.S. PATENT DOCUMENTS

| | | | |
|---|---|---|---|
| 2002/0051576 A1* | 5/2002 | Choi et al. | 382/218 |
| 2002/0131641 A1* | 9/2002 | Luo et al. | 382/218 |
| 2004/0267740 A1* | 12/2004 | Liu et al. | 707/3 |

* cited by examiner

*Primary Examiner* — Pierre M Vital
*Assistant Examiner* — Truong V Vo
(74) *Attorney, Agent, or Firm* — Seth H. Ostrow; Ostrow Kaufman LLP (57) ABSTRACT

The present invention is directed towards systems and methods for improving image labeling using content-based image retrieval. The method according to one embodiment of the present invention comprises selecting an image query and identifying a first image related to the image query. The method then selects a plurality of second images related to the first image and assigns weights to the plurality of second images. Finally, the method displays the first images and the second images on a client device.

20 Claims, 6 Drawing Sheets

| Image Name | Weight | # of Clicks |
|---|---|---|
| Image 1 | BONUS | 124 |
| Image 2 | BONUS | 100 |
| Image 3 | PENALTY | 250 |
| Image 4 | PRIMARY | 84 |
| Image 5 | BONUS | 67 |
| Image 6 | PENALTY | 125 |

Fig. 4A

| Image Name | Weight | # of Clicks |
|---|---|---|
| Image 1 | BONUS | 152 |
| Image 2 | BONUS | 151 |
| Image 3 | PENALTY | 147 |
| Image 4 | PRIMARY | 150 |
| Image 5 | BONUS | 154 |
| Image 6 | PENALTY | 152 |

Fig. 4B

| Image Name | Weight | # of Clicks |
|---|---|---|
| Image 1 | BONUS | 130 |
| Image 2 | BONUS | 97 |
| Image 3 | PENALTY | 120 |
| Image 4 | PRIMARY | 25 |
| Image 5 | BONUS | 106 |
| Image 6 | PENALTY | 117 |

Fig. 4C

| Image Name | Weight | # of Clicks |
|---|---|---|
| Image 1 | BONUS | 25 |
| Image 2 | BONUS | 31 |
| Image 3 | PENALTY | 2 |
| Image 4 | PRIMARY | 506 |
| Image 5 | BONUS | 21 |
| Image 6 | PENALTY | 6 |

SYSTEM AND METHOD FOR PROVIDING IMAGE LABELING GAME USING CBIR

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to improving the accuracy of image labeling using content-based image retrieval ("CBIR"). More specifically, embodiments of the present invention are directed towards systems, methods and computer program products for accurately labeling images through use of a game that uses a combination of CBIR techniques and human computation.

BACKGROUND OF THE INVENTION

Since the conception of the first search engines significant research, design and production of reliable and efficient text search engines has been seen. The resulting engines provide a high degree of associativity between textual queries and web pages on the Internet. As technology developed, image searching appeared as a natural extension to textual searching. The basic premise was to enable users to enter textual string and return relevant image files to the user based on the entered query.

The determination of relevance in the realm of images, however, is significantly more complex than that of text documents. For example, images are unable to be read in the conventional manner, that is, by extracting keywords and text from the search corpus. Thus, current image search technologies rely on text surrounding an image, such as body text or text within hyperlinks associated with a given image. These methods have been proved to be effective, but far from perfect.

Various other techniques have employed human computation, which involves pushing a portion of the processing load to a user. An example of this strategy is an image labeling algorithm that requests a first and second user to enter a label for a provided image. The algorithm then compares the labels provided by the first and second users, if the label matches, the label is applied to the image, if not, it is discarded, as the conflicting labels indicate that neither is an appropriate label choice for the given image.

Again, this technique provided a slight increase in accuracy, but still suffers from a variety of inherent problems. First, the scope of the process is limited due to language constraints—to enter a label for an image, a user must have a reasonable command of the English language. The use of a two-player architecture forces the two users to have the same level of proficiency of the English language and thus adds further complications to the system. Secondly, the current methodology is unable to handle multiword labels efficiently as the complexity involved in multiword queries is unable to be supported in the current art. Thus there is a need in the art for a system and method for efficiently and accurately labeling images in a search environment.

SUMMARY OF THE INVENTION

The present invention is directed towards systems, methods and computer program products for improving image labeling using content-based image retrieval. The method of the present invention comprises selecting an image query and identifying a first image related to the query. In one embodiment, identifying a first image related to the query is performed by a human editor.

The method then selects a plurality of second images related to the first image. In one embodiment, selecting a plurality of second images related to the first image may comprise utilizing a CBIR algorithm; wherein said first image may be to seed said CBIR algorithm. After selecting a plurality of second images, the method then assigns weights to said plurality of second images. In one embodiment, weights may correspond to a "bonus", "penalty" and "primary" label. Finally, the method displays said first images and said second images on a client device. In one embodiment, displaying said first images and said second images on a client device may comprise displaying said first images within a web browser.

In an alternative embodiment, the method may further comprise monitoring interaction of a user with said first image and said second plurality of images and storing the interactions. Additionally the method may perform data mining analyses on said stored interactions; wherein said data mining analyses comprises identifying correct query to image associations.

The present invention is further directed towards a system for improving image labeling using content-based image retrieval. The system of the present invention comprises a plurality of client devices connected to a network and a content provider operative to select an image query and identify a first image related to the image query. In one embodiment, identifying a first image related to the image query may be performed by a human editor.

The content provider is further operative to select a plurality of second images related to the first image. In one embodiment, selecting a plurality of second images related to the first image may comprise utilizing a CBIR algorithm; wherein said first image is used to seed said CBIR algorithm. The content provider then assigns weights to said plurality of second images. In a first embodiment, weights may correspond to "bonus", "penalty" and "primary" labels. Finally, the content provider transmits said first images and said second images to said client devices. In one embodiment, displaying said first images and said second images on a client device comprises displaying said first images within a web browser.

In an alternative embodiment, the method may further comprise monitoring interaction of a user with said first image and said second plurality of images and storing the interactions. Additionally the method may perform data mining analyses on said stored interactions; wherein said data mining analyses comprises identifying correct query to image associations.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
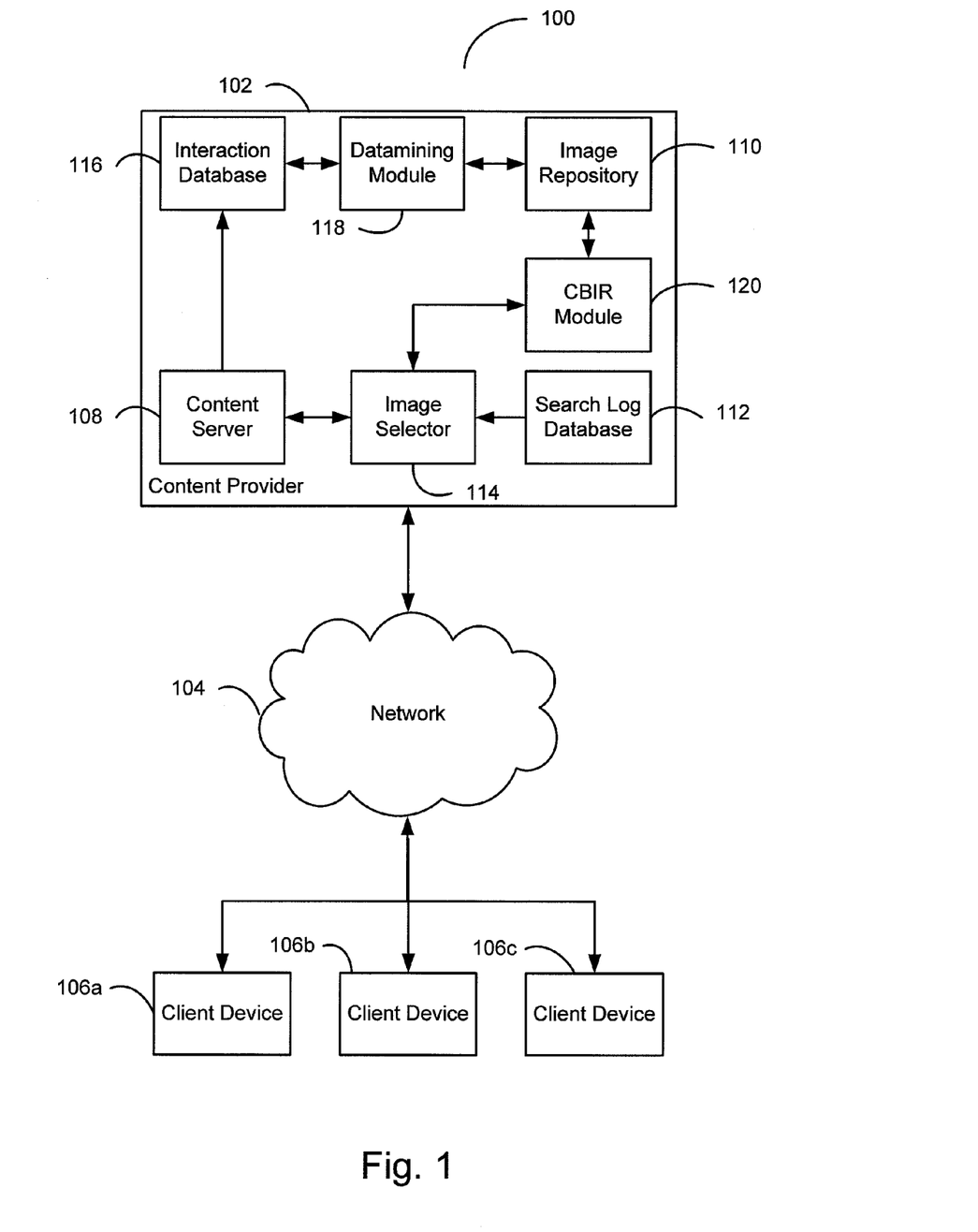
FIG. 1 presents a block diagram illustrating a system a system for improving the accuracy of image labeling using content-based image retrieval according to one embodiment of the present invention.

FIG. 1 presents a block diagram illustrating a system a system for improving the accuracy of image labeling using content-based image retrieval. According to the illustrated embodiment, one or more client devices 106a, 106b and 106c are communicatively coupled to a network 104, which may include a connection to one or more local and wide area networks, such as the Internet.

According to one embodiment of the invention, a given client device 106a, 106b and 106c is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A given client device 106a, 106b and 106c may be in communication with a content provider 102 that hosts one or more content items. The content provider 102 may maintain one or more content servers 108, a given content server 108 hosting one or more web pages. Content sever 108 is operative to receive requests from a given client 106a, 106b and 106c and transmit responses to client requests.

Content provider 102 further comprises an image selector 114 operative to select a plurality of images from image repository 110 for transmission to a given client device 106a, 106b and 106c. In one embodiment, image selector 114 may be operative to generate a set of related images dynamically in response to a user request. In an alternative embodiment, image selector 114 may be operative to fetch pre-compiled sets of images from image repository 110.

As discussed above, image selector 114 may be operative to generate a set of related images. In one embodiment, image selector 114 performs this function by first selecting a search query resident in search log database 112. In one embodiment, search log database 112 may comprise a relational database operative to store a plurality of user image queries and associated selected images for a given query. In response to selecting a given image query log and associated selected images from search log database 112, image selector 114 utilizes the selected images to seed a content-based image retrieval module 120. As known in the art, content-based image retrieval is a method of retrieving visually similar images based upon an initial image data set, or "seed".

CBIR module 120 utilizes the received images and accesses image repository 110 to generate a ranked plurality of similar images to the received images. Image selector 114 is then operative to assign weights to the plurality of images. In one embodiment, weights may comprise a "bonus image" or "penalty image" weighting scheme. Image selector 114 the returns the image set to content server 108 which, in turn, assembles and transmits the data set to a given client device 106a, 106b and 106c.

According to the illustrated embodiment, an assembled data set may comprise and HTML page containing interactive components, such as JavaScript. The assembled data set may be presented to the client as a grid of the retrieved images, allowing a given client to select a plurality of the presented images and transmit an indication of the user selection to content provider 102.

In response to receiving an indication of a client selection, content server 108 is operative to transmit the identification of the client selected image to interaction database 116. In one embodiment, interaction database 116 may comprise a relational database operative to store a given image query string and an associated client action, such as selection of a positive or negative weighted image.

Interaction database 116 is further coupled to data mining module 118. In one embodiment, data mining module 118 is operative to analyze the data stored within the interaction database 116 and update image query/image set associations provided to a given client device 108a-c. Operations of the data mining module 118 are discussed in detail with respect to FIGS. 4A-4D.

Figure 2:
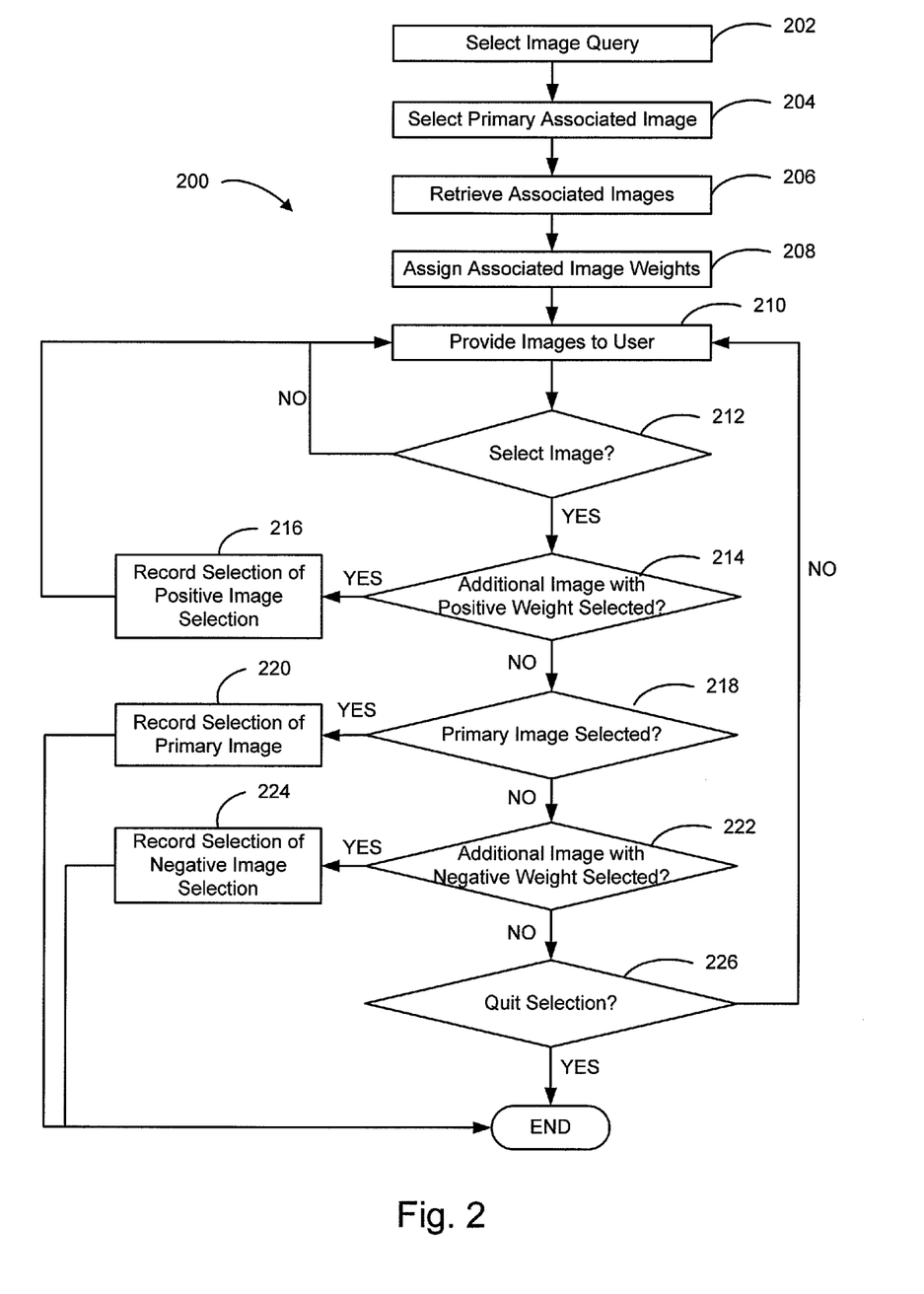
FIG. 2 presents a flow diagram illustrating providing an image data set and recording user interaction with the provided data set according to one embodiment of the present invention.

FIG. 2 presents a flow diagram illustrating providing an image data set and recording user interaction with the provided data set according to one embodiment of the present invention. As illustrated in FIG. 2, the method 200 begins by selecting an image query, step 202. As previously discussed, an image query may comprise an alphanumeric string representing a user query for a plurality of images. In one embodiment, the method 200 chooses the image query at random in response to a user request for an image data set.

Upon selecting an image query, the method 200 selects a primary image associated with the given image query, step 204. In one embodiment, an associated primary image may be selected by a human editor. In an alternative embodiment, an associated primary image may be automatically selected based upon locating the image clicked on most in response to the image query. The method 200 utilizes the retrieved primary associated image to retrieve a plurality of additional images, step 206. In one embodiment, the method 200 utilizes the primary associated image to seed a CBIR algorithm to retrieve images visually similar to the primary associated image.

The method 200 then assigns weights to plurality of retrieved images in steps 204 and step 206, step 208. In an exemplary embodiment, weights assigned to images may comprise assigning a "special" weight to the primary associated image, "bonus" weights to a plurality of similar images and "penalty" weights to a plurality of dissimilar images. In one embodiment, the assigned weights may be inserted into an HTML document via HTML or JavaScript statements.

The method 200 provides the plurality of images to a given user, step 210, and continues providing said plurality of images while waiting for interaction from the user, step 212. In one embodiment, providing a plurality of images to a given user may comprise serving an HTML page containing the plurality of images and a plurality of associated hyperlinks or JavaScript statements to a given user. Additionally, a descriptive tag or query may be provided to the user, the descriptive tag or query being directed towards the primary image selected in step 204.

If a user selects a provided image, the method 200 first checks to determine whether an image with a positive weight has been selected, step 214. In one embodiment, an image with a positive weight may correspond to an image automatically selected using a primary image to seed a CBIR algorithm. If the positive weighted image is selected, the method 200 records the selection of the positive image selection, step 216. In one embodiment, recording a selection of a positive image selection may comprise storing or updating a database record associated with the selected image stored within a relational database.

In addition to selecting a positively weighted image, the user may select a primary image, step 218, or a negatively weight image, step 222. In both scenarios, the method 200 records the selection of the primary image, step 220, or the negative image, step 224, respectively. Similarly to the recording of a positive image selection, recording a selection of a negative or primary image selection may comprise storing or updating a database record associated with the selected image stored within a relational database. Upon selection of a primary or negative image, the method 200 ends. Alternatively, if a given user does not select a provided image, the user may select a quit option, step 226. In response to selecting a quit option, the method 200 ends.

Figure 3:
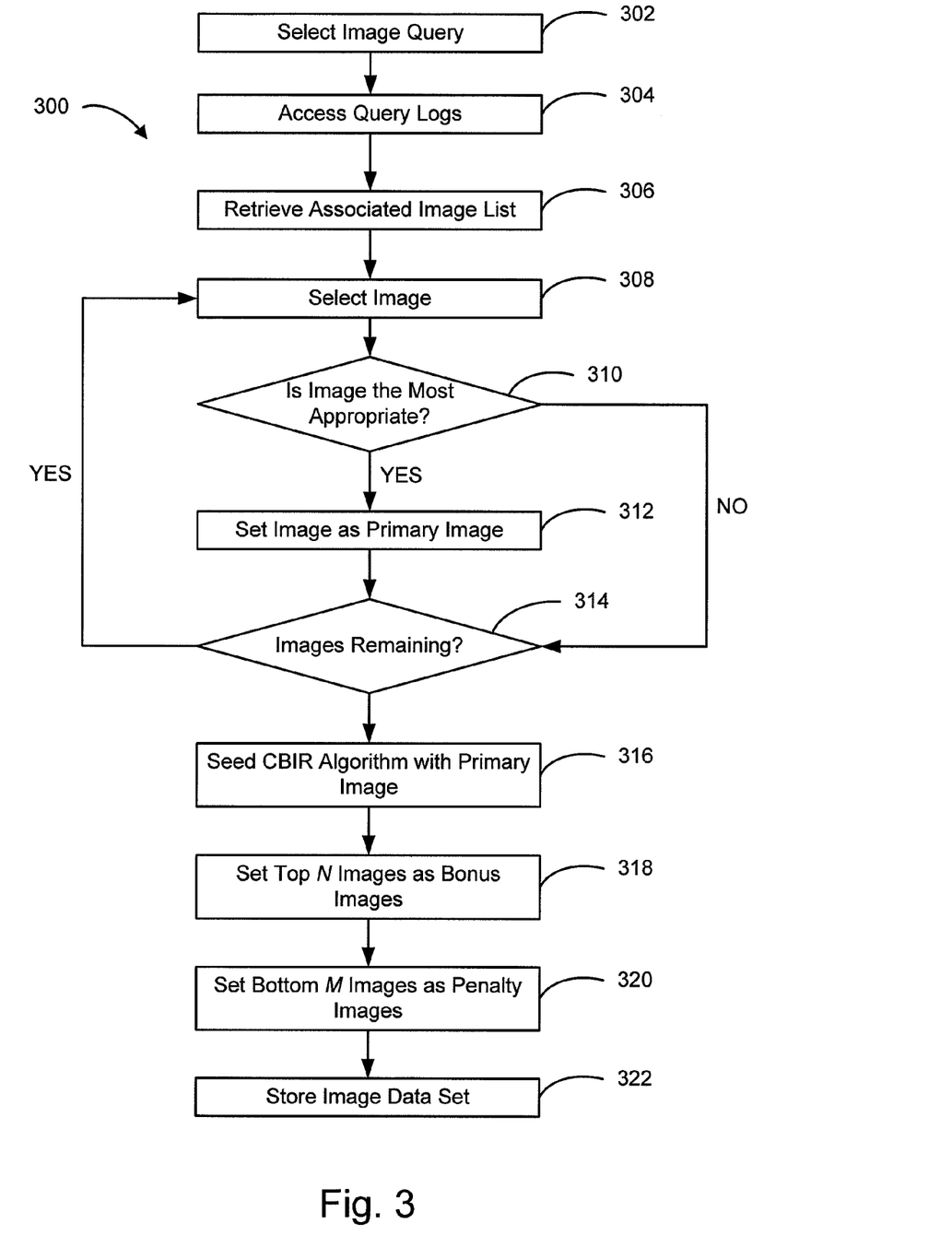
FIG. 3 presents a method for algorithmically generating a plurality of similar images based upon a selected primary image according to one embodiment of the present invention.

FIG. 3 presents a method for algorithmically generating a plurality of similar images based upon a selected primary image according to one embodiment of the present invention. As illustrated in FIG. 3, the method 300 selects an image query, step 302. As previously discussed, an image query may comprise an alphanumeric string representing a user query for a plurality of images. In one embodiment, the method 300 chooses the image query at random in response to a user request for an image data set.

Using the selected query, the method 300 accesses at least one query log associated with a given selected query. In one embodiment, a query log may comprise a log of interaction between a given user query and selected search results. That is, a query log may comprise a list of images selected in response to a given query. The method 300 uses the query logs to generate a listing of images associated with a query, step 306. The method 300 then selects a given image from the listing of images, step 308, and determines if the image is the most appropriate image for the given image query, step 310. If the image is currently the most appropriate image, the method 300 sets the current image as the most appropriate image, step 312. The method 300 then determines if any images are remaining in the image list, step 314. If images are remaining in the image list, steps 308, 310, 312 and 314 are repeated for the remaining images. In one embodiment, the method illustrated in steps 308, 310, 312 and 314 may be performed manually by a trained human editor.

After a plurality of images have been inspected in steps 308, 310, 312 and 314, the primary image selected in step 312 is utilized to seed a CBIR algorithm, step 316. As known in the art, CBIR is a technique utilized to retrieve visually similar images based upon an initial seed image or set of images. In the illustrated embodiment, the CBIR algorithm may return a set of N+M+C results based on a given primary image seed. In one embodiment, C results may correspond to a set of discarded image results, as is described in greater detail below.

The method 300 selects the top N result images and identifies the top N result images as "bonus" images, step 318. The method 300 also selects the bottom M result images and identifies these bottom M result images as "penalty" images, step 320. In one embodiment, the number of top and bottom images, as well as the total number of returned images may be determined by a user, which may comprise determining in advance.

As briefly discussed, the result images returned from the CBIR algorithm may contain a plurality of images represented by the variable C. These images may correspond to those images between the highest N and lowest M ranked images. In one embodiment, the values of N and M may be fixed values, wherein the value of C is directly proportional to the total number of results T specified to be returned by the CBIR algorithm.

FIGS. 4A-4D present the state of a database table comprising user interactions with one or more images according to one embodiment of the present invention. FIGS. 4A-4D illustrate exemplary states of a table 4000 operative to maintain records of aggregate user interactions with a plurality of images 4018. As FIGS. 4A-4D illustrate, table 4000 contains a plurality of columns representing image name 4010, image weight 4012 ("bonus", "primary" and "penalty") and number of clicks 4016. The following examples provide details with regard to how the results collected in accordance with the method 200 may be mined to extract novel and useful information relating to the association of image queries to image data.

Figure 4A:
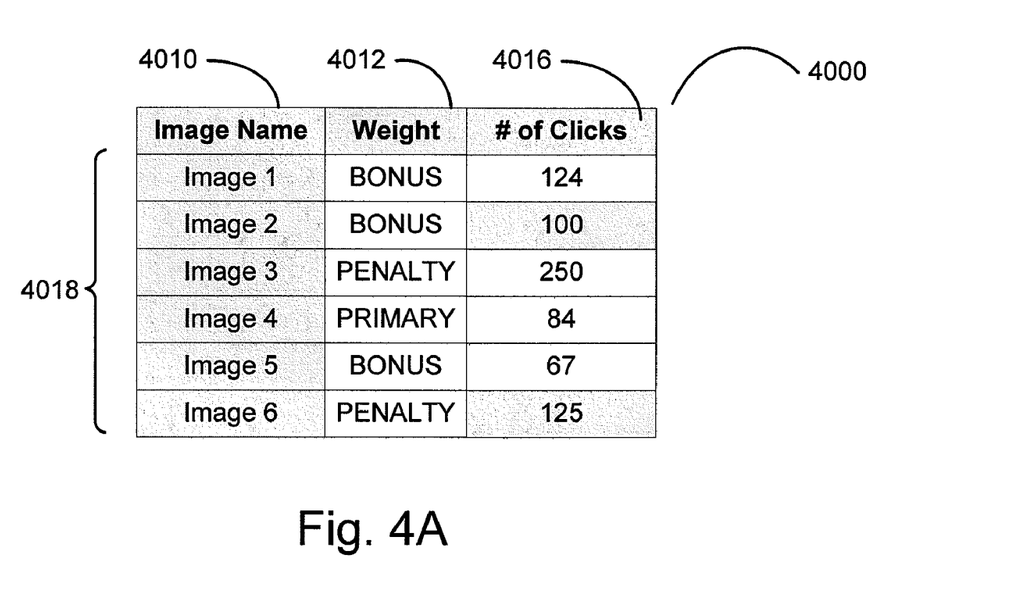
FIGS. 4A-4D present the state of a database table comprising user interactions with one or more images according to one embodiment of the present invention.

FIG. 4A presents a scenario wherein a majority of users select a negatively weighted penalty image, as compared to a plurality of bonus images or the primary image. In the embodiment of FIG. 4A, 250 users select Image 3, weighted as a penalty image. As can be seen, the number of users selecting the penalty image (Image 3) is double the amount of users selecting the highest rated positively weighted image or primary image. Using data mining techniques, embodiments of the present invention may infer that the image (Image 3) identified as a penalty image may, in fact, be the most appropriate image for the given image query and may update an associated image query record to indicate the change in primary image.

Figure 4B:
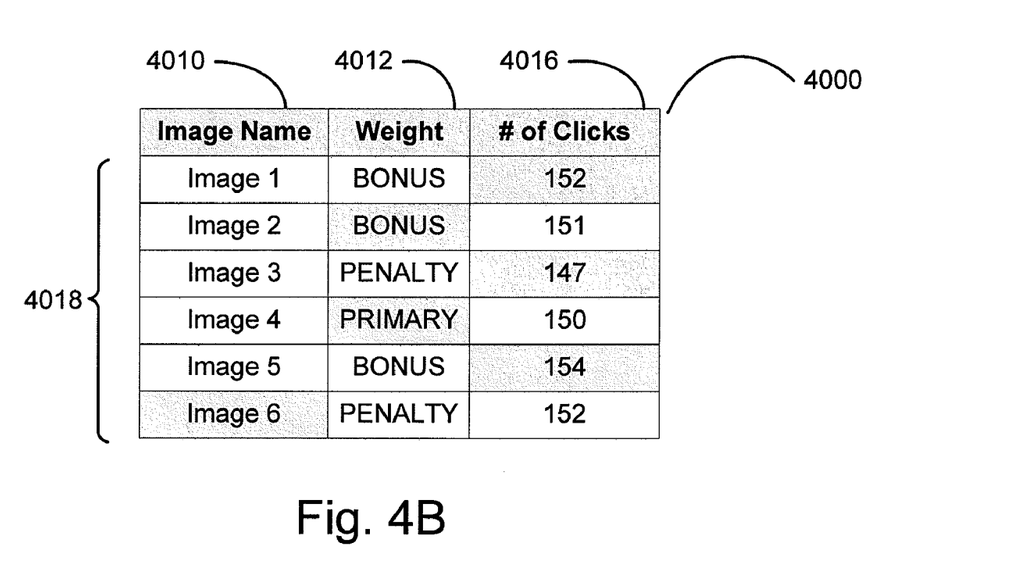

FIG. 4B presents a scenario wherein the images associated with a given image query receive a similar number of selections from a plurality of users. As can be seen, the number of clicks for a given image varies around the arithmetic mean of 151 clicks, having a standard deviation of 2.16 clicks. In this illustrated embodiment, a data mining algorithm may determine that none or all of the images are relevant to the given image query and may, for example, select a new set of images for the given image query. In one embodiment, the data mining algorithm may make the preceding decision on the basis of a standard deviation criterion. For example, if the standard deviation across a set of images for a given query is less than 20 clicks, all images should be discarded and replaced with new images.

Figure 4C:
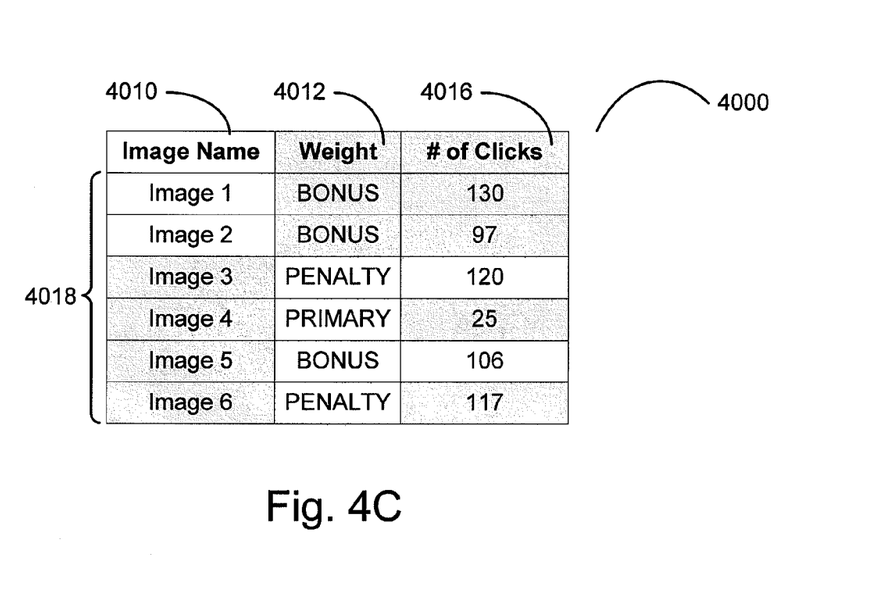

FIG. 4C presents a scenario wherein the primary image does not receive a large majority of clicks from a plurality of users. As can be seen in FIG. 4C, all other images, with the exception of the primary image, gravitate around the arithmetic mean of 114 with a standard deviation of 11.44 clicks. However, the primary image receives 25 clicks, well below the mean of the remaining images. In this scenario, a data mining algorithm may determine that the primary image is not, in fact, relevant to the given image query and should be replaced.

Figure 4D:
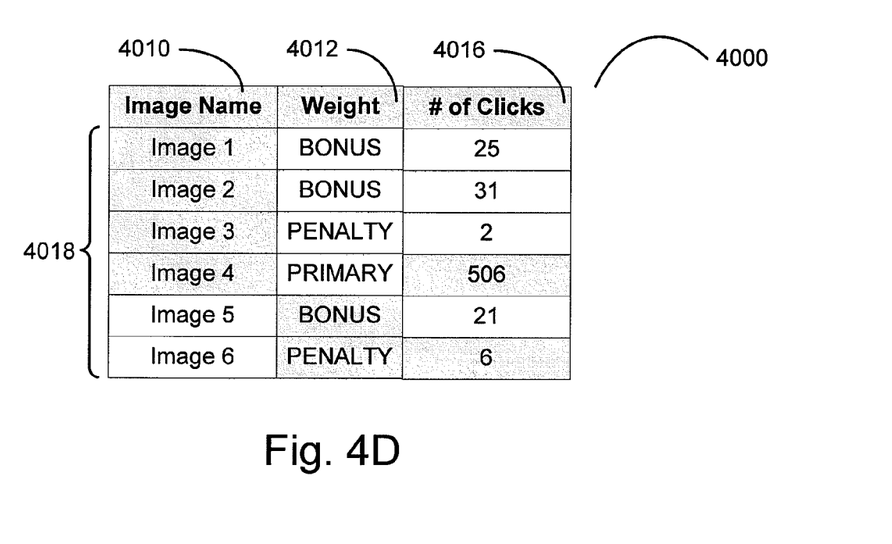

FIG. 4D illustrates the state of a database table maintaining data representing the bonus images associated with a given query not receiving a substantial amount of clicks. As FIG. 4D illustrates, the primary image (Image 4) receives an overwhelming amount of the overall clicks for a given image set (506). The bonus images, however, receive substantially fewer clicks (25, 31 and 21). A data mining algorithm may determine that the bonus images selected by a CBIR algorithm are incorrect, and may subsequently instruct a CBIR algorithm to choose a second set of bonus images.

FIGS. 4A-4D provide exemplary data mining operations performed on a database of image interactions. Alternative embodiments exist, however, wherein additional data mining procedures may be performed on a given data set. Additionally, multiple data mining operations may be combined to perform a plurality of combination operations on a given data set.

Figure 5:
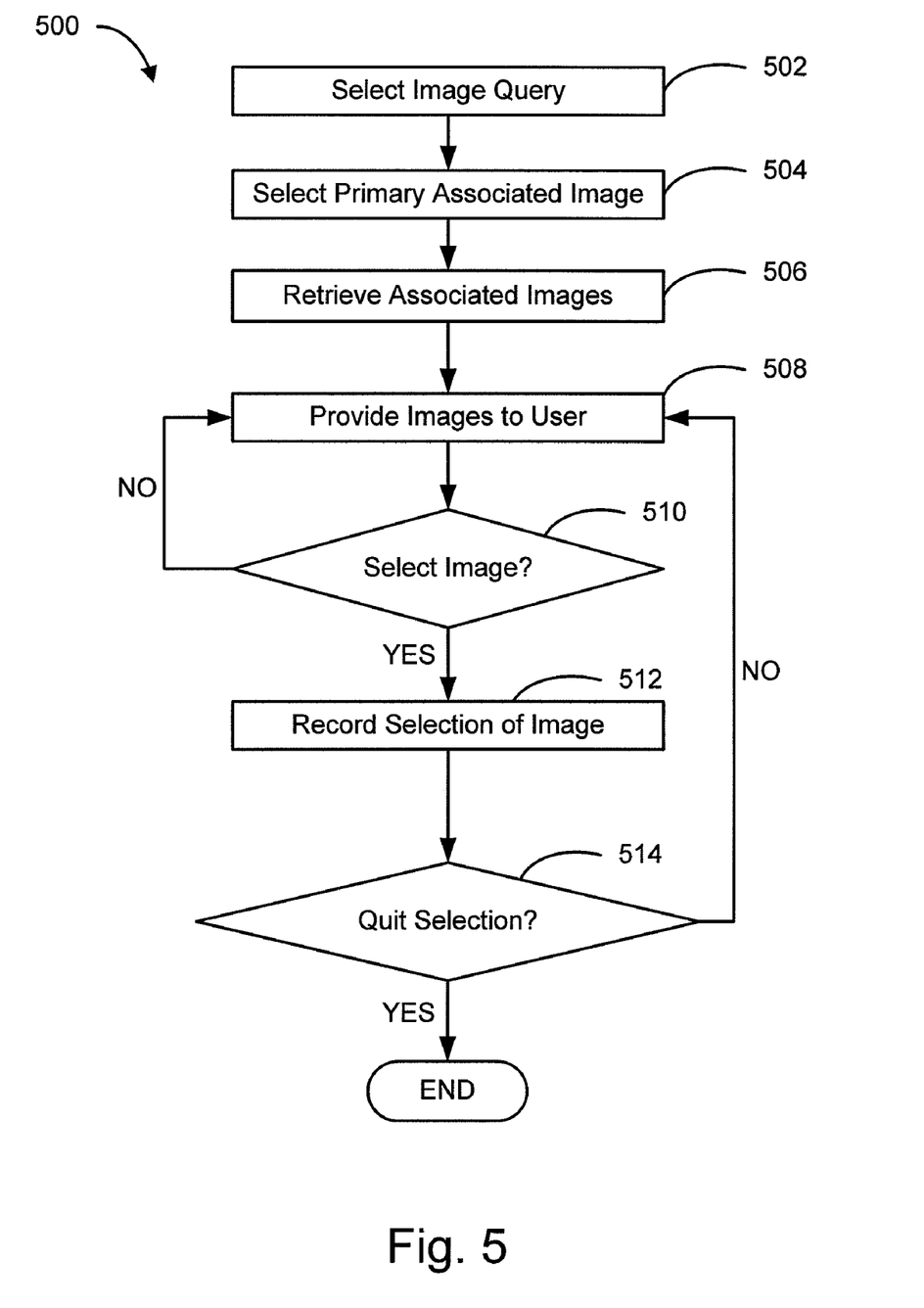
FIG. 5 presents a flow diagram illustrating a method for boot strapping a CBIR-based image labeling system according to one embodiment of the present invention.

FIG. 5 presents a flow diagram illustrating a method for boot strapping a CBIR-based image labeling system according to one embodiment of the present invention. The method 500 illustrates a method for quickly initializing an application of the present invention by providing a "barebones" version of the method 200. As illustrated, an image query is selected, step 502, and a primary associated image is selected for the selected image query, step 503.

The method 500 utilizes the retrieved primary associated image to retrieve a plurality of additional images, step 506. In one embodiment, the method 500 utilizes the primary associated image to seed a CBIR algorithm to retrieve images visually similar to the primary associated image.

The method 500 provides the plurality of images to a given user, step 508, and continues providing said plurality of images while waiting for interaction from the user, step 510. In one embodiment, providing a plurality of images to a given user may comprise serving an HTML page containing the plurality of images and a plurality of associated hyperlinks or JavaScript statements to a given user. Additionally, a descriptive tag or query may be provided to the user, the descriptive tag or query being directed towards the primary image selected in step 504.

If a user selects a provided image, the method 500 records the selection of the selected image, step 512. In one embodiment, recording a selection of an image may comprise storing or updating a database record associated with the selected image stored within a relational database. The method 500 also checks to determine if a given user selects a quit option, step 514. If the user decides to quit, the method 500 ends.

As can be seen in the illustrated embodiment of FIG. 5, the method 500 does not contain weighted image, but rather an un-weighted collection of images. Subsequently, the method 500 does not penalize a user for the selection of a negatively weighted image, but rather collects the images that a user chooses to be relevant to a given image query. Method 500 therefore enables the illustrated embodiment to generate an initial data set of similar images for a given image query.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for improving image labeling using content-based image retrieval, the method comprising:
    selecting an image query;

identifying a first image related to said image query based on an association between the first image and the image query, wherein the first image corresponds to a primary result;

retrieving a plurality of second images related to said first image, wherein the second images correspond to secondary results relative to the primary result;

assigning weights to the first image and said plurality of second images on the basis of the association between the first image and the image query and a similarity of the plurality of second images to the first image;

transmitting said first image and said second images to one or more client devices associated with a plurality of users;

receiving one or more selections of the transmitted first and second images in association with the image query from the one or more client devices;

determining a relevancy of the first image to the image query and a relevancy for each of the plurality of second images to the image query according to respective amounts of the one or more selections received for the transmitted first image and the plurality of second images in association with the image query;

determining an adjustment based on a discrepancy between the determined relevancies and the corresponding weights assigned to the first and second images in the one or more selections; and updating the association between the first image and the image query based on the adjustment.

2. The method of claim 1 further comprising monitoring interaction of a user with said first image and said second plurality of images.

3. The method of claim 2 further comprising: storing said interactions.

4. The method of claim 3 further comprising: performing data mining analyses on said stored interactions.

5. The method of claim 4 wherein said data mining analyses comprises identifying correct query to image associations.

6. The method of claim 1 wherein identifying a first image related to said image query is performed by a human editor.

7. The method of claim 1 wherein selecting a plurality of second images related to said first image comprising utilizing a CBIR algorithm.

8. The method of claim 7 wherein said first image is used to seed said CBIR algorithm.

9. The method of claim 1 wherein said weights correspond to a "bonus", "penalty" and "primary" label.

10. The method of claim 1 wherein displaying said first images and said second images on a client device comprises displaying said first images within a web browser.

11. A system for improving image labeling using content-based image retrieval, the system comprising:
a network; and
a content provider communicatively connected to a plurality of client devices via the network operative to:
select an image query;
identify a first image related to said image query based on an association between the first image and the image query, wherein the first image corresponds to a primary result;
retrieve a plurality of second images related to said first image, wherein the second images correspond to secondary results relative to the primary result;
assign weights to the first image and said plurality of second images on the basis of the association between the first image and the image query and a similarity of the plurality of second images to the first image;
transmit said first image and said second images to said client devices associated with a plurality of users;
receive one or more selections of the transmitted first and second images in association with the image query from the client devices;
determine a relevancy of the first image to the image query and a relevancy for each of the plurality of second images to the image query according to respective amounts of the one or more selections received for the transmitted first image and the plurality of second images in association with the image query;
determine an adjustment based on a discrepancy between the determined relevancies and the corresponding weights assigned to the first and second images in the one or more selections; and
update the association between the first image and the image query based on the adjustment.

12. The system of claim 11 further comprising monitoring interaction of a user with said first image and said second plurality of images.

13. The system of claim 12 further comprising: storing said interactions.

14. The system of claim 13 further comprising: performing data mining analyses on said stored interactions.

15. The system of claim 14 wherein said data mining analyses comprises identifying correct query to image associations.

16. The system of claim 11 wherein identifying a first image related to said image query is performed by a human editor.

17. The system of claim 11 wherein selecting a plurality of second images related to said first image comprising utilizing a CBIR algorithm.

18. The system of claim 17 wherein said first image is used to seed said CBIR algorithm.

19. The system of claim 11 wherein said weights correspond to a "bonus", "penalty" and "primary" label.

20. The system of claim 11 wherein displaying said first images and said second images on a client device comprises displaying said first images within a web browser.

* * * * *